United States Patent [19]
Schuetzenduebel et al.

[11] Patent Number: 5,724,807
[45] Date of Patent: Mar. 10, 1998

[54] COMBINED GAS TURBINE-STEAM CYCLE WASTE-TO-ENERGY PLANT

[75] Inventors: Wolfram G. Schuetzenduebel, Pike Road, Ala.; Daniel M. Smith, Pembroke Pines, Fla.

[73] Assignee: Montenay International Corp., Miami, Fla.

[21] Appl. No.: 790,247

[22] Filed: Jan. 28, 1997

Related U.S. Application Data

[62] Division of Ser. No. 449,399, May 23, 1995, Pat. No. 5,623,822.

[51] Int. Cl.$^6$ .................................................. F02C 6/00
[52] U.S. Cl. ................................. 60/39.464; 60/39.182
[58] Field of Search ........................ 60/39.464, 39.182, 60/39.02, 39.5, 39.19; 110/234

[56] References Cited

U.S. PATENT DOCUMENTS

| | | | |
|---|---|---|---|
| 3,325,992 | 6/1967 | Sheldon | 60/39.182 |
| 4,050,388 | 9/1977 | Boyd | 110/8 P |
| 4,253,300 | 3/1981 | Willyoung | 60/39.182 |
| 4,261,166 | 4/1981 | Mayrhofer | 60/39.182 |
| 4,272,953 | 6/1981 | Rice | 60/39.182 |
| 4,352,341 | 10/1982 | Styslinger | 122/7 R |
| 4,414,813 | 11/1983 | Knapp | 60/39.182 |
| 4,485,746 | 12/1984 | Erlandsson | 110/234 |
| 4,519,207 | 5/1985 | Okabe et al. | 60/39.182 |
| 4,574,744 | 3/1986 | Lorenz et al. | 122/7 R |
| 4,638,765 | 1/1987 | Skinner | 122/7 R |
| 4,665,841 | 5/1987 | Kish | 110/234 |
| 4,785,622 | 11/1988 | Plumley et al. | 60/39.182 |
| 4,823,740 | 4/1989 | Ohshita et al. | 122/4 D |
| 4,852,344 | 8/1989 | Warner | 60/39.182 |
| 4,858,562 | 8/1989 | Arakawa et al. | 122/7 R |
| 4,882,903 | 11/1989 | Lowry, Jr. et al. | 60/39.182 |
| 4,896,496 | 1/1990 | Zervos | 60/39.182 |
| 4,944,252 | 7/1990 | Motai et al. | 122/470 |
| 4,957,049 | 9/1990 | Strohmeyer, Jr. | 110/234 |
| 4,987,954 | 1/1991 | Boucher | 165/138 |
| 5,072,675 | 12/1991 | Fowler | 110/346 |
| 5,099,771 | 3/1992 | DiSanto, Sr. | 110/235 |
| 5,134,944 | 8/1992 | Keller et al. | 110/234 |
| 5,285,629 | 2/1994 | Gounder | 60/39.12 |
| 5,289,786 | 3/1994 | Clay | 110/233 |
| 5,325,796 | 7/1994 | Garcia-Mallol | 110/245 |
| 5,341,766 | 8/1994 | Hyppanen | 122/4 D |
| 5,345,883 | 9/1994 | Panos | 110/345 |
| 5,375,410 | 12/1994 | Briesch et al. | 60/39.182 |
| 5,623,822 | 4/1997 | Schetzenduebel et al. | 60/39.182 |

OTHER PUBLICATIONS

"Combined–Cycle Power Plants", R. Loftness: Energy Handbook, Van Nostrand Reinhold Company, 1978, p. 389, Energy Conversion and Storage.

J.E. Hopkins, 1991, "GE Gas Turbine Performance Characteristics," 35th GE Turbine State–of–the–Art Technology Seminar, pp. 4–5.

"The Specific Heat Consumption in Modern and Future Steam Power Stations", Modern Steam Power Stations, Karl Schröder, Published by Siemens–Schuckertwerke A.G., Berlin/Erlangen, Germany, pp. 15–16, 19.

"The Boiler Heating Surface", Karl Schröder, Modern Steam Power Stations, Published by Siemens–Schuckertwerke A.G., Berlin/Erlangen, Germany, pp. 43–44, 47–48.

*Primary Examiner*—Timothy S. Thorpe
*Assistant Examiner*—Ted Kim
*Attorney, Agent, or Firm*—Pennie & Edmonds

[57] ABSTRACT

A waste-to-energy plant which is designed and operated to burn municipal waste combines a high pressure steam turbine/generator cycle and a combustion turbine/generator cycle; wherein the exit gas from the combustion turbine is utilized to superheat high pressure steam prior to entering the steam turbine. The combination of the combustion turbine/generator cycle with the steam turbine/generator cycle enables operation of the waste-to-energy plant at high pressure and high temperature resulting in greatly increased thermal cycle efficiency while eliminating superheater surfaces from the waste heat recovery boiler, thereby greatly reducing corrosion problems associated with waste heat recovery boilers.

10 Claims, 1 Drawing Sheet

COMBINED GAS TURBINE-STEAM CYCLE WASTE-TO-ENERGY PLANT

This is a division of application Ser. No. 08/449,399, filed May 23, 1995, now U.S. Pat. No. 5,623,822.

BACKGROUND OF THE INVENTION

The present invention relates to waste treatment facilities which burn municipal waste. Typical waste-to-energy ("WTE") plants burn municipal solid waste for the purpose of volume reduction of the waste prior to landfill disposal. The heat generated in the combustion process is typically recovered in a special design heat recovery boiler where it produces steam. The steam is then either condensed directly for reintroduction into the cycle as boiler feedwater, or is economically exploited in the form of process steam or used to produce electrical power via a steam turbine generator set. The present invention particularly relates to WTE plants which utilize the heat of combustion of the waste to generate electrical power.

In order to obtain a reasonable power generation efficiency, the steam is required to be superheated in a superheater which is typically an integral part of the heat recovery boiler. Typical municipal solid waste ("MSW") contains many components whose combustion results in the formation of acid gases. Acid gases are highly corrosive to the metal components of the heat recovery boiler, with corrosion effects increasing with metal temperature. Boiler component metal temperatures are basically a function of the inside water or steam temperature rather than the outside flue gas temperature. Therefore, in order to reduce the effect of acid gas corrosion attack on the boiler components, specifically the superheater tubes, WTE plant heat recovery boilers operate at rather low steam conditions. Typical steam pressures range from 600 to 1000 psig, with associated saturation temperatures of about 500 to 650° F. Typical main steam temperatures in WTE plants are kept below 800° F. resulting in superheater metal temperatures below 1000° F. It is known that a single cycle WTE facility operating at relatively low steam conditions will achieve a relatively low overall thermal cycle efficiency, in the neighborhood of 25%. Despite these measures, superheater corrosion in WTE plant heat recovery boilers is a common problem, requiring frequent superheater repairs and replacements.

It is generally known that combined cycle power plants, combining a steam turbine-generator set with a combustion turbine-generator set can achieve thermal cycle efficiencies up to almost twice as high as low pressure, low temperature single cycle power plants.

U.S. Pat. No. 4,882,903 to Lowry Jr. et al. discloses a combined cycle waste-to-energy plant including a steam turbine-generator set and a combustion turbine-generator set. Lowry states that the low efficiency of conventional waste-to-energy facilities is attributable to the fact that much of the heat derived from combustion of the waste is expended in heating the combustion air delivered to the incinerator and in drying and heating moisture contained in the waste (col. 1, lines 20–25). Lowry discloses utilizing the hot exhaust gas from the combustion turbine to dry and heat the moisture containing waste and the combustion air. Upon exiting the combustion turbine, the hot exhaust gas is passed through a steam superheater to reduce its temperature from approximately 1000° F. to 600° F., then the 600° F. exhaust gas flows to the incinerator. A portion of the 600° F. exhaust gas may also be fed into the waste heat recovery boiler (col. 2, lines 42–50). Lowry also states that the products of combustion of some wastes are corrosive to alloy steels used to achieve high steam superheat temperatures (col. 1, lines 31–34), and that the disclosed plant utilizes only the high temperature exhaust gases discharged from the combustion turbine to produce superheated steam (col. 7, lines 25–29). While Lowry alludes to an increase in efficiency resulting from the use of combustion turbine exhaust gas to dry and heat the waste and incinerator inlet air, no actual examples of thermal efficiencies are given. In fact, Lowry gives no working examples at all, and does not address working pressures or percentage efficiency attained.

U.S. Pat. No. 4,957,049 to Strohmeyer, Jr. discloses a combined cycle steam plant integrated with a sludge incineration process wherein the heat generated in the sludge combustor reheats the gas turbine exhaust gas at a mid-point of the overall cycle (col. 2, lines 25–30 and col. 3, lines 3–6). Immediately upon exiting the gas turbine, the gas turbine exhaust is fed to a heat recovery boiler which includes boiler and superheater surfaces (col. 3, lines 19–22). The heat recovery boiler feeds a steam turbine-generator set. Upon exiting the heat recovery boiler, a portion of the gas turbine exhaust may be fed to a sludge pellet dryer while a parallel portion of the gas turbine exhaust is used to support the combustion of the dried sludge pellets. The heat input from the sludge pellet firing system regenerates the gas turbine exhaust stream, which is then fed into a second heat recovery boiler, which includes economizer, boiler and superheater surfaces. The second heat recovery boiler also feeds steam to the steam turbine-generator set. In the sole example given, Strohmeyer discloses an operating pressure of 650 psig in the first waste heat boiler and 360 psig in the second waste heat boiler. Higher operating pressures are not addressed or suggested.

U.S. Pat. No. 4,852,344 to Warner discloses a combined cycle waste-to-energy plant wherein the gas turbine exhaust may be fed to the waste incinerator or may be combined with the incinerator outlet gas stream. The gas turbine exhaust may also be fed directly to a heat recovery boiler, which includes boiler and superheater surfaces. In the only operating example discussed, Warner discloses a boiler steam conditions of 685 psig/755° F. and a steam turbine conditions of 650 psig/750° F. In the background section of the specification, Warner states that an efficiency increase in the order of 8% could be realized at steam conditions of about 1000 psig and 840° F., but excessive high temperature corrosion of boiler surfaces will result due to acids formed by the waste incineration (col. 1, lines 16–22).

U.S. Pat. No. 5,072,675 to Fowler discloses a process for waste treatment which includes 1) passing organic waste into a chamber; 2) pumping an inert gas into the chamber until the pressure within the chamber is at least 10,000 psi; 3) heating the chamber to over 300° F.; 4) dissociating the organic waste into gaseous constituents; 5) passing the gaseous constituents through a turbine to produce electricity; 6) then passing the gaseous constituents into what is referred to as a boiler; 7) mixing oxygen containing gas, such as air, with the gaseous constituents within the boiler so as to produce what is referred to as steam; 8) passing the steam through a turbine to produce electricity. While the Fowler patent does disclose a waste treatment facility having two turbines, it does not address the problem of waste heat recovery boiler superheater surface corrosion or overall thermal cycle efficiency.

There has been a long felt need in the WTE field for a system and method of operation which effect increased superheater temperatures, increased pressures and increased thermal cycle efficiencies while minimizing the aforementioned corrosion problems inherent in all WTE facilities.

SUMMARY OF THE INVENTION

The present invention combines a municipal solid waste burning facility having a waste heat recovery boiler which feeds a steam turbine to produce electrical power with a combustion turbine which burns either gaseous or liquid fuel in a manner which increases overall plant thermal cycle efficiency while at the same time eliminating the problem of superheater corrosion in the WTE plant heat recovery boiler system.

More particularly, the present invention incorporates a fuel combustion turbine cycle producing electrical power wherein the exhaust gas of the combustion turbine provides the heat for superheating high pressure steam which is generated by a high pressure waste-fired heat recovery boiler. Design and operation of a combined cycle waste-to-energy facility in accordance with the present invention results in dramatic increases in overall thermal cycle efficiency. Additionally, use of the invention allows superheating of the steam by "clean" combustion turbine outlet gas, thus allowing for superheating to any desired level without any of the superheater corrosion which would result from the customary use of MSW combustion gases for superheating.

DETAILED DESCRIPTION OF THE PREFERRED EMBODIMENT

Figure 1:
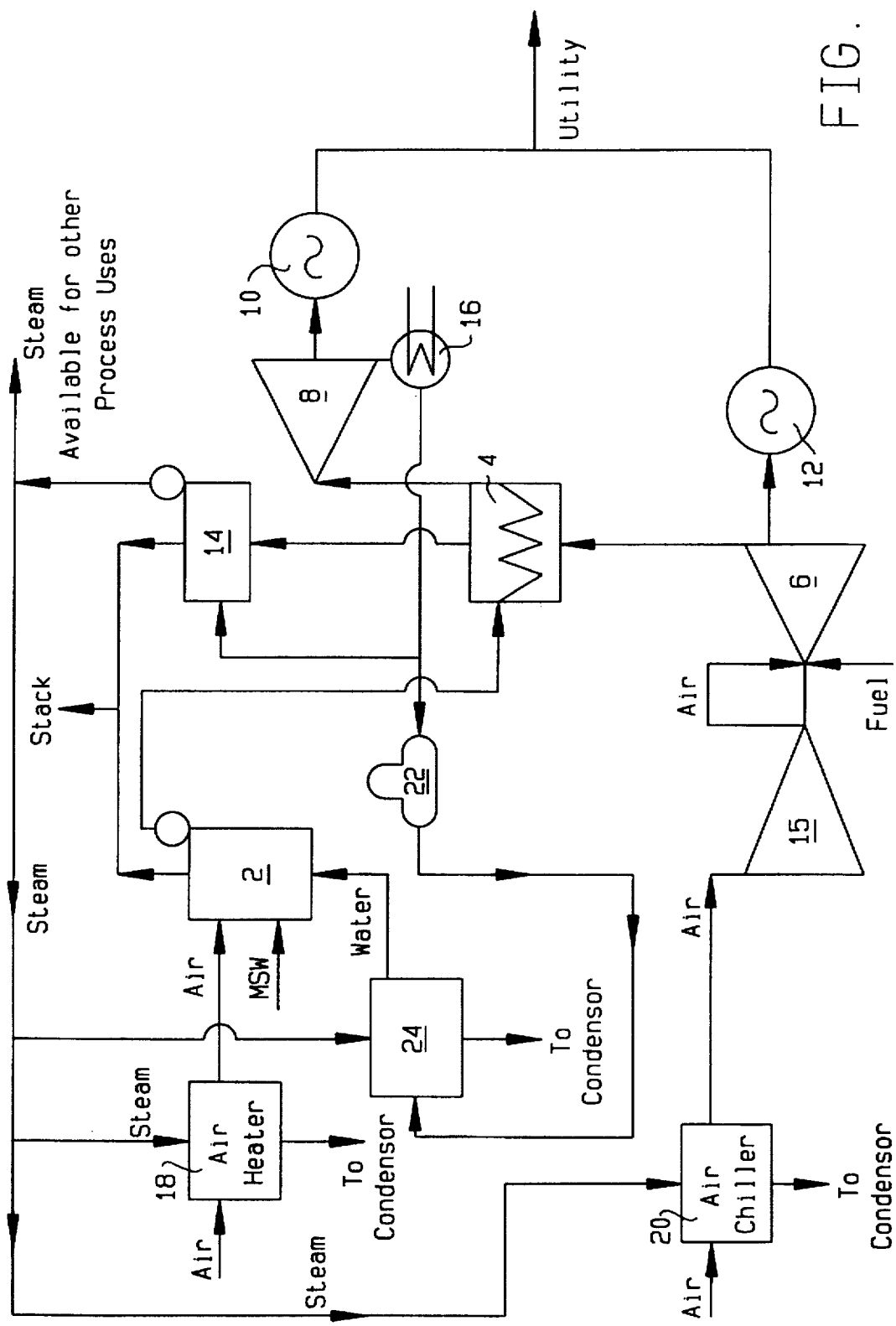
FIG. 1 is a schematic diagram of a combined cycle waste-to-energy plant in accordance with the invention.

As shown in FIG. 1, air and MSW are fed into waste heat recovery boiler 2 wherein the combustion of the MSW generates saturated steam. Waste heat recovery boiler 2 may include economizer (water heater) and/or air heater heating surfaces for efficiency improvement, but preferably does not have any superheater surfaces. The absence of superheater surfaces from the waste heat recovery boiler 2 allows more heat for the production of saturated steam. The elimination of superheater surfaces from waste heat recovery boiler 2 also means that the excessively high metal temperature surfaces are eliminated, therefore the problem of boiler component corrosion and attendant superheater repairs or replacements is greatly reduced. Additionally, since saturated steam temperature rises slowly with increased pressure, the present system allows for the design and operation of saturated steam WTE plant heat recovery boilers at significantly higher pressures, without any significant increase in corrosive attack on the evaporator surfaces, thereby increasing overall thermal cycle efficiency. Saturated steam conditions utilized may be from approximately 1000 psi/545° F. to 2000 psi/636° F. or higher, with approximately 1500 psi/596° F. being presently preferred.

The WTE plant heat recovery boiler 2 is in fluid communication with a "separately fired" superheater 4, where the superheater 4 is an independent unit which derives its heat from the exhaust of combustion turbine 6. The combustion turbine 6 is designed such that its exhaust gas stream at high temperature will superheat the saturated steam flow from the WTE plant saturated steam heat recovery boiler 2 to the desired steam temperature level. Superheated steam conditions may range from about 200° F. to 600° F. or more above the saturated steam temperature, with presently preferred superheat steam conditions being about 1500 psia/ 1000° F. Combustion turbine exhaust gas temperature will usually range from about 1000° F. to 1200° F., with 1107° F. being presently preferred. As the exhaust gas from the combustion turbine 6 is clean gas, i.e. it does not contain acid gases, corrosion is of no concern and main steam temperatures can be selected to achieve high overall thermal efficiency. The steam from the separately fired superheater 4 is conveyed to a conventional steam turbine 8/generator 10 set which is advantageously designed for high pressure, high temperature steam conditions with high thermal cycle efficiency.

Depending on the steam conditions chosen and the desired flue gas outlet temperature from the separately fired superheater, the outlet gas from the superheater may be further cooled, such as by use in an additional low pressure steam generator 14 in the same gas path as the superheater surfaces. The low pressure steam so generated may be utilized as process steam for such operations as an air preheater 18 upline from the waste heat recovery boiler; to provide power to operate an air chiller 20 upline from combustion turbine 6; de-aerator/feedwater heaters; gas turbine $NO_x$ reduction; building heating, etc. With further cooling of the combustion turbine exhaust gases, additional overall thermal efficiency improvement is possible.

The combustion turbine-generator set produces electrical power which is conveyed together with the electrical power from the steam turbine generator set to the utility power grid or other consumer.

More particularly, as illustrated in FIG. 1, a combined cycle WTE facility in accordance with the invention includes a waste heat boiler 2, which utilizes the heat of combustion of municipal solid waste to generate saturated steam, and a steam superheater 4, which utilizes the outlet gas from a separately fired combustion turbine 6 to superheat the steam. The steam outlet of the superheater 4 is fed into steam turbine 8 which powers electrical generator 10.

Combustion turbine 6 is powered by the combustion gases of clean liquid or gaseous fuel. The combustion turbine 6 powers electrical generator 12. The electrical power generated by the combined cycle WTE facility may be conveyed to the local utility power grid.

Additionally, as illustrated in FIG. 1, the combustion gases produced by burning the municipal solid waste may be sent to the smokestack upon exiting waste heat recovery boiler 2.

Advantageously, the clean combustion gas outlet of steam superheater 4 may be fed into one or more low pressure steam generators 14. The steam thereby produced may be utilized for a number of operations. As shown in FIG. 1, the steam may be fed into air preheater 18 located upstream of waste heat recovery boiler 2, and may also be utilized in the operation of an air chiller 20 which feeds chilled air into air compressor 15 located upstream of combustion turbine 6. If additional low pressure steam is available from steam generator 14, it may be used in other plant operations, such as de-aerator/feedwater heaters, gas turbine $NO_x$ reduction, building heating, etc.

Also, the steam outlet from steam turbine 8 may be passed through a condenser 16 prior to being returned as feed water to waste heat recovery boiler 2 and/or steam generator 14. The condenser 16 may be fed with cooling water or may be air cooled to absorb the heat of condensation.

To further improve cycle efficiency, feedwater for the waste heat recovery boiler 2 may be passed through one or more de-aerators 22 and feedwater heaters 24, which receives feedwater from condenser 16 and steam from steam generator 14. Upon exiting the low pressure steam generator (s), the clean combustion gas may be sent to the smokestack.

EXAMPLE I

A standard state of the art single cycle WTE facility which is supplied with fuel input of 1,212 tons/day (50.5 tons/hour or 101,000 pounds/hour) of municipal solid waste having a heating value of 5,200 BTU/pound has a total heat input of 525 Million BTU/hour. The waste heat recovery boiler in such a system will produce approximately 149,221 lb/hr of superheated steam at 620 psia/750° F. which will generate 38,120 KW in a steam turbine-generator set. Converting the KW to BTU/hr (1 KW=3,412 BTU/hr) results in approximately 130 Million BTU/hr energy output. The thermal cycle efficiency is, therefore, 130 million BTU/hr output/525 Million BTU/hr input, which calculates to approximately 25%.

A combined cycle WTE facility designed and operated in accordance with the present invention which is fed with 101,000 lbs/hr MSW (525 Million BTU/hr) to the waste heat recovery boilers and b) 33,100 lb/hr of methane fuel (711, 748,000 BTU/hr), 1,489,000 lb/hr of 50% relative humidity air at 80° F. and atmospheric pressure and 70,300 lb/hr of water to the combustion turbine has a total energy input of 1,236,748,000 BTU/hr. The waste heat recovery boiler produces approximately 485,000 lb/hr of saturated steam at 1500 psia/596° F. which is superheated in a "separately fired" superheater to 1500 psia/1000° F. utilizing the combustion turbine exhaust (1,592,000 lb/hr at 1107° F.). The superheated steam is fed to a steam turbine-generator set which produces 70,013 KW. The combustion turbine-generator set which is supplied with 33,100 lb/hr methane produces 73,680 KW. The total energy output of the combined cycle WTE facility is 143,693 KW, which converts to 490,280,520 BTU/hr. The thermal cycle efficiency is, therefore, 491,280,250/1,236,748,000, which calculates to 39.6%. Also, the use of a separately fired superheater avoids corrosion which would result from the use of waste combustion gases for superheating.

This vast improvement in thermal cycle efficiency is obtained while eliminating waste heat recovery boiler superheating surfaces, and the corrosion problems associated therewith. Additionally, the combined cycle WTE facility assumed for purpose of the example did not include such efficiency enhancers as an air chiller upstream of the combustion turbine.

The equipment design of all of the equipment required for the combined cycle WTE facility is well known in the industry, and the present invention is not limited by the particular design parameters or features of the equipment. For example, the waste heat recovery boiler 2, combustion turbine 6, steam superheater 4 and steam turbine 8 may each be designed for a wide range of various temperature and pressure conditions while remaining within the scope of the present invention.

I claim:

1. A waste treatment facility which operates efficiently and reduces boiler plant corrosion comprising:
   a) a high pressure waste heat recovery boiler having a recovery boiler steam outlet, said waste heat recovery boiler being designed and configured to burn municipal, commercial, or industrial waste to generate saturated steam at a pressure of at least 1000 psia from feed water;
   b) a high pressure steam superheater, having at least a first side and a second side, said first side having a steam inlet in fluid communication with the recovery boiler steam outlet, said steam superheater being designed and configured to superheat steam having a pressure of at least 1000 psia;
   c) the first side of said steam superheater having a superheated steam outlet for the exit of superheated steam having a pressure of at least 1000 psia;
   d) a combustion turbine having a combustion gas outlet, said combustion turbine being designed and configured to burn fuel to power the combustion turbine, and wherein the combustion gas outlet is in fluid communication exclusively with the second side of the steam superheater and the combustion gas provides heat to superheat steam flowing through the first side of said steam superheater;
   e) a steam turbine designed and configured to operate by means of superheated steam having a pressure of at least 1000 psia, said steam turbine having an inlet in fluid communication with said superheated steam outlet of said steam superheater; and
   f) said steam superheater having a combustion gas outlet in exclusive fluid communication with a combustion turbine exhaust gas heat recovery unit.

2. A waste treatment facility in accordance with claim 1 further comprising:
   a first electrical generator in communication with and powered by said steam turbine.

3. A waste treatment facility in accordance with claim 2 further comprising:
   a) a second electrical generator in communication with and powered by said steam turbine.

4. A waste treatment facility in accordance with claim 3 further comprising:
   a) said steam turbine having a turbine steam outlet;
   b) a steam condenser having an inlet and a condensed steam outlet, said steam condenser inlet in fluid communication with the turbine steam outlet and said condensed steam outlet in fluid communication with said waste heat recovery boiler, wherein said condensed steam outlet provides feed water to said waste heat recovery boiler.

5. A waste treatment facility in accordance with claim 4 further comprising:
   a) a deaerator having a deaerator inlet and a deaerator outlet;
   b) said deaerator inlet in fluid communication with said condensed steam outlet; and
   c) said deaerator outlet in fluid communication with said waste heat recovery boiler.

6. A waste treatment facility in accordance with claim 4 further comprising:
   a) a water preheater having a preheater water inlet and a preheater water outlet;
   b) said preheater water inlet in fluid communication with said condensed steam outlet; and
   c) said preheater water outlet in fluid communication with said waste heat recovery boiler.

7. A waste treatment facility in accordance with claim 1 wherein said combustion turbine exhaust gas heat recovery unit is a steam generator and wherein said superheater combustion gas outlet provides heat to generate steam in said steam generator.

8. A waste treatment facility in accordance with claim 7 further comprising:
   a) said steam generator having a generated steam outlet;
   b) an air preheater in fluid communication with said generated steam outlet, wherein said generated steam outlet provides heat to said air preheater;

c) said air preheater having a preheated air outlet in fluid communication with said waste heat recovery boiler.

9. A waste treatment facility in accordance with claim 7 further comprising:

a) said steam generator having a generated steam outlet;

b) an air chiller in fluid communication with said generated steam outlet, wherein said generated steam outlet provides steam to power a portion of said air chiller;

c) said air chiller having a chilled air outlet;

d) an air compressor in fluid communication with said chilled air outlet, wherein said chilled air outlet provides chilled air to said air compressor; and e) said air compressor having a compressed air outlet in fluid communication with said combustion turbine, wherein said air compressor provides compressed air to said combustion turbine.

10. A waste treatment facility which operates efficiently and reduces boiler plant corrosion comprising:

a) a high pressure waste heat recovery boiler having a recovery boiler steam outlet, said waste heat recovery boiler being designed and configured to burn municipal, commercial, or industrial waste to generate saturated steam at a pressure of at least 1000 psia from feed water;

b) a high pressure steam superheater, having at least a first side and a second side, said first side having a steam inlet in fluid communication with the recovery boiler steam outlet, said steam superheater being designed and configured to superheat steam having a pressure of at least 1000 psia;

c) the first side of said steam superheater having a superheated steam outlet for the exit of superheated steam having a pressure of at least 1000 psia;

d) a combustion turbine having a combustion gas outlet, said combustion turbine being designed and configured to burn fuel to power the combustion turbine, and wherein the combustion gas outlet is in fluid communication exclusively with the second side of the steam superheater and the combustion gas provides heat to superheat steam flowing through the first side of said steam superheater;

e) a steam turbine designed and configured to operate by means of superheated steam having a pressure of at least 1000 psia, said steam turbine having an inlet in fluid communication with said superheated steam outlet of said steam superheater;

f) said steam superheater having a combustion gas outlet in exclusive fluid communication with a combustion turbine exhaust gas heat recovery unit;

g) a first electrical generator in communication with and powered by said steam turbine; and h) a second electrical generator in communication with and powered by said combustion turbine.

* * * * *